(12) United States Patent
Zhang et al.

(10) Patent No.: US 11,500,089 B2
(45) Date of Patent: Nov. 15, 2022

(54) CONTROL METHOD AND DEVICE FOR ULTRASONIC RECEIVING DEVICE

(71) Applicant: NOLO CO., LTD., Beijing (CN)

(72) Inventors: Yiming Zhang, Beijing (CN); Jianing Zhang, Beijing (CN); Daoning Zhang, Beijing (CN)

(73) Assignee: Nolo Co., Ltd., Beijing (CN)

( * ) Notice: Subject to any disclaimer, the term of this patent is extended or adjusted under 35 U.S.C. 154(b) by 0 days.

(21) Appl. No.: 16/956,517

(22) PCT Filed: Mar. 16, 2018

(86) PCT No.: PCT/CN2018/079324
§ 371 (c)(1),
(2) Date: Jun. 19, 2020

(87) PCT Pub. No.: WO2019/119654
PCT Pub. Date: Jun. 27, 2019

(65) Prior Publication Data
US 2021/0088654 A1    Mar. 25, 2021

(30) Foreign Application Priority Data
Dec. 22, 2017  (CN) .......................... 201711407686.6
Dec. 22, 2017  (CN) .......................... 201711408869.X
Dec. 22, 2017  (CN) .......................... 201711408878.9

(51) Int. Cl.
*G01S 15/10*    (2006.01)
*G01S 7/52*     (2006.01)
*G01S 7/526*    (2006.01)

(52) U.S. Cl.
CPC ........ *G01S 15/101* (2013.01); *G01S 7/52004* (2013.01); *G01S 7/526* (2013.01)

(58) Field of Classification Search
CPC .... G01S 15/101; G01S 7/52004; G01S 7/526; G01S 7/40; G01S 7/524; G01S 15/88;
(Continued)

(56) References Cited

U.S. PATENT DOCUMENTS 6,045,506 A       4/2000  Hossack
10,118,696 B1 *  11/2018  Hoffberg ............... B64C 39/001
(Continued)

FOREIGN PATENT DOCUMENTS

CN    101118282 A    2/2008
CN    102525436 A    7/2012
(Continued)

*Primary Examiner* — Daniel L Murphy
*Assistant Examiner* — Amie M Ndure
(74) *Attorney, Agent, or Firm* — David B. Tingey; Bryant J. Keller; Kirton McConkie

(57) ABSTRACT

Disclosed are a control method and a control device for an ultrasonic receiving device. The control method includes: determining a target receiver of the ultrasonic receiving device, where the ultrasonic receiving device includes at least two ultrasonic receivers, and the target receiver is one of the at least two ultrasonic receivers on the ultrasonic receiving device that is the nearest to an ultrasonic transmitting device; and controlling a state of each of the at least two ultrasonic receivers on the ultrasonic receiving device based on the determined target receiver. Thus, the ultrasonic ranging error is reduced, and the accuracy of measurement is improved.

12 Claims, 4 Drawing Sheets

(58) Field of Classification Search
CPC .... G01S 15/34; G01S 15/878; G01S 15/8915;
G01S 7/54; G01S 17/32; G01S 19/19;
G01F 23/2962; G01F 22/00; G01F
23/0076; G01F 23/2968; G01F 25/0061;
G10K 11/006; G10K 11/34; G10K
11/346; G10K 11/002; G10K 11/004;
G10K 11/178; G10K 11/28; G10K
11/348; G10K 11/35; G10K 2200/11;
H04R 3/00; H04R 1/406; H04R 3/005;
H04R 17/00; H04R 19/04; H04R 1/028;
H04R 1/04; H04R 1/083; H04R 1/323;
H04R 1/326; H04R 2201/003; H04R
2499/11; H04R 2499/13; H04R 29/00;
H04R 3/002; H04R 3/04
See application file for complete search history.

(56) References Cited

U.S. PATENT DOCUMENTS

| | | | |
|---|---|---|---|
| 2008/0247565 A1* | 10/2008 | Elko | H04S 3/002 381/92 |
| 2008/0317277 A1* | 12/2008 | Herrick | G01S 13/888 382/100 |
| 2010/0271186 A1 | 10/2010 | Tanaka et al. | |
| 2011/0304497 A1* | 12/2011 | Molyneux | A63B 24/0062 342/42 |
| 2013/0138246 A1* | 5/2013 | Gutmann | G05D 1/0274 700/253 |
| 2014/0046463 A1* | 2/2014 | Molyneux | G01S 13/82 700/91 |
| 2014/0295874 A1* | 10/2014 | Hohteri | A63F 13/12 455/456.1 |
| 2016/0098095 A1* | 4/2016 | Gonzalez-Banos | A63F 13/92 345/156 |
| 2017/0188993 A1* | 7/2017 | Hamilton | A61B 8/0808 |
| 2018/0115855 A1* | 4/2018 | Bakish | H04S 3/008 |
| 2019/0182415 A1* | 6/2019 | Sivan | G06F 3/013 |

FOREIGN PATENT DOCUMENTS

| | | |
|---|---|---|
| CN | 102549451 A | 7/2012 |
| CN | 101567728 B | 9/2012 |
| CN | 102713663 A | 10/2012 |
| CN | 102721942 A | 10/2012 |
| CN | 103707801 A | 4/2014 |
| CN | 103763042 A | 4/2014 |
| CN | 104111445 A | 10/2014 |
| CN | 104407325 A | 3/2015 |
| CN | 104569958 A | 4/2015 |
| CN | 104792862 A | 7/2015 |
| CN | 105022066 A | 11/2015 |
| CN | 105116406 A | 12/2015 |
| CN | 106483525 A | 3/2017 |
| CN | 106908083 A | 6/2017 |
| JP | H09113617 A | 5/1997 |

* cited by examiner

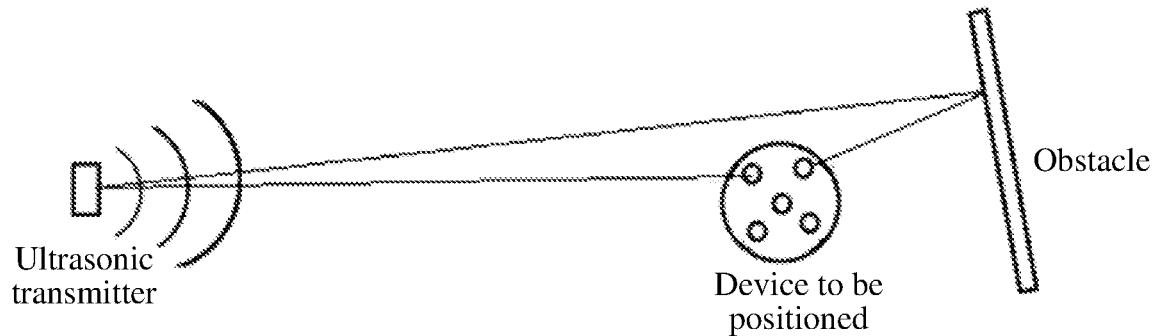

FIG. 1

```
┌─────────────────────────────────────────────────────┐
│ Determining a target receiver of the ultrasonic receiving │
│ device, the target receiver being the ultrasonic receiver on │──── S201
│ the ultrasonic receiving device that is the nearest to an │
│ ultrasonic transmitting device │
└─────────────────────────────────────────────────────┘
                          │
                          ▼
┌─────────────────────────────────────────────────────┐
│ Controlling the state of each ultrasonic receiver on the │
│ ultrasonic receiving device based on the determined │──── S202
│ target receiver │
└─────────────────────────────────────────────────────┘
```

FIG. 2

CONTROL METHOD AND DEVICE FOR ULTRASONIC RECEIVING DEVICE

CROSS-REFERENCES TO RELATED APPLICATIONS

This application is a United States national stage application of International Patent Application Number PCT/CN2018/079324, filed on Mar. 16, 2018, which claims the priority and benefit of Chinese patent application Nos. 201711408878.9, 201711408869.X, 201711407686.6, all filed Dec. 22, 2017 with China National Intellectual Property Administration, contents of all of which are incorporated herein by reference in their entireties.

TECHNICAL FIELD

The present application relates to, but is not limited to, ultrasonic technologies, and, in particular, relates to a control method and a control device for an ultrasonic receiving device.

BACKGROUND

Ultrasonic waves are a part of acoustic waves, inaudible to human ears, and have frequencies higher than 20 kHz (kilohertz). The propagation of the ultrasonic waves is characterized by strong directivity, slow energy attenuation, and a long distance of propagation in media. Thus, the ultrasonic waves are typically used for ranging purposes.

As an implementation of ultrasonic ranging, an ultrasonic transmitter and an ultrasonic receiver are included, and the difference between times when the ultrasonic receiver receives an ultrasonic signal and when the ultrasonic transmitter sends the ultrasonic signal is multiplied by the propagation speed of the ultrasonic signal, to obtain the distance between the ultrasonic transmitter and the ultrasonic receiver.

SUMMARY

The following is a summary of the subject matter described herein in detail. This summary is not intended to limit the scope of protection conferred by the appended claims.

Embodiments of the present application provide a control method and device for an ultrasonic receiving device, which can reduce the ultrasonic ranging error and improve accuracy of measurement.

In a first aspect, an embodiment of the present application provides a control method for an ultrasonic receiving device. The ultrasonic receiving device includes at least two ultrasonic receivers. The control method includes the following operations:

determining a target receiver of the ultrasonic receiving device, the target receiver being one of the at least two ultrasonic receivers on the ultrasonic receiving device that is the nearest to an ultrasonic transmitting device; and controlling a state of each of the at least two ultrasonic receivers on the ultrasonic receiving device based on the determined target receiver.

In an exemplary implementation, the operation of controlling the state of each of the at least two ultrasonic receivers on the ultrasonic receiving device based on the determined target receiver may include the following:

controlling the target receiver and an ultrasonic receiver meeting a set condition with the target receiver to be in an activated state, and controlling an ultrasonic receiver that does not meet the set condition with the target receiver to be in a closed state.

In an exemplary implementation, the ultrasonic receiver that meets the set condition with the target receiver may include an ultrasonic receiver on the ultrasonic receiving device at a distance to the target receiver that meets a first threshold, or an ultrasonic receiver on the ultrasonic receiving device that lies within a range taking the target receiver as a center and a second threshold as a radius.

In an exemplary implementation, the operation of determining the target receiver of the ultrasonic receiving device may include: determining the target receiver based on data of time when an ultrasonic signal is received by each of the at least two ultrasonic receivers on the ultrasonic receiving device within a plurality of signal cycles.

In an exemplary implementation, the control method may further include operations described below after the operation of controlling the state of each of the at least two ultrasonic receivers on the ultrasonic receiving device based on the determined target receiver:

adjusting the target receiver based on data of time when an ultrasonic signal is received by an activated ultrasonic receiver on the ultrasonic receiving device in a current signal cycle; and adjusting the state of each of the at least two ultrasonic receivers on the ultrasonic receiving device in a next signal cycle based on the adjusted target receiver.

In an exemplary implementation, the operation of adjusting the state of each of the at least two ultrasonic receivers on the ultrasonic receiving device in the next signal cycle based on the adjusted target receiver may include:

controlling the adjusted target receiver and an ultrasonic receiver that meets a set condition with the adjusted target receiver to be in an activated state, and controlling an ultrasonic receiver that does not meet the set condition with the adjusted target receiver to be in a closed state.

In an exemplary implementation, the operation of adjusting the target receiver based on the data of time when the ultrasonic signal is received by the activated ultrasonic receiver on the ultrasonic receiving device in the current signal cycle may include:

from the data of time when the ultrasonic signal is received in the current signal cycle, selecting data of time whose difference from reference data of time has an absolute value less than or equal to a third threshold, and adjusting an ultrasonic receiver corresponding to the selected data of time to be the target receiver, wherein the reference data of time is data of time when the ultrasonic signal is received by a target receiver in a previous signal cycle.

In an exemplary implementation, the control method may further include at least one of the operations described below:

controlling a signal strength of an ultrasonic signal transmitted by the ultrasonic transmitting device according to a target measurement range; or determining a strength threshold of an ultrasonic signal received by the ultrasonic receiving device, and controlling the ultrasonic receiving device to filter out a received ultrasonic signal with signal strength less than the strength threshold.

In an exemplary implementation, the control method may further include the operation described below:

controlling a signal cycle of the ultrasonic signal transmitted by the ultrasonic transmitting device based on the target measurement range and an ultrasonic propagation speed.

In an exemplary implementation, the control method may further include operations described below:

determining a positioning distance of the ultrasonic receiving device in a second period based on a moving speed, acceleration, and ultrasonic measurement distance between the ultrasonic transmitting device and the ultrasonic receiving device in a first period;

determining an ultrasonic measurement distance between the ultrasonic transmitting device and the ultrasonic receiving device in the second period; and correcting the ultrasonic measurement distance between the ultrasonic transmitting device and the ultrasonic receiving device in the second period based on a result of comparison between the ultrasonic measurement distance against the positioning distance of the ultrasonic receiving device in the second period;

where the second period is a next signal cycle of the first period.

In an exemplary implementation, the operation of correcting the ultrasonic measurement distance between the ultrasonic transmitting device and the ultrasonic receiving device in the second period based on the result of comparison between the ultrasonic measurement distance against the positioning distance of the ultrasonic receiving device in the second period may include:

in response to an absolute value of a difference between the ultrasonic measurement distance and the positioning distance in the second period being less than or equal to a fourth threshold, determining that the ultrasonic measurement distance from the ultrasonic transmitting device to the ultrasonic receiving device in the second period remains unchanged; and in response to the absolute value of the difference between the ultrasonic measurement distance and the positioning distance in the second period being greater than the fourth threshold, correcting the ultrasonic measurement distance between the ultrasonic transmitting device and the ultrasonic receiving device in the second period to be the positioning distance in the second period.

In an exemplary implementation, the operation of determining the positioning distance of the ultrasonic receiving device in the second period based on the moving speed, acceleration, and ultrasonic measurement distance between the ultrasonic transmitting device and the ultrasonic receiving device in the first period may include:

calculating the positioning distance of the ultrasonic receiving device in the second period according to the following formula:

$$S = S_0 + V_0 t + \tfrac{1}{2} a t^2$$

where S is the positioning distance in the second period, $S_0$ is the ultrasonic measurement distance between the ultrasonic transmitting device and the ultrasonic receiving device in the first period, t is a signal cycle, and $V_0$ is the moving speed of the ultrasonic receiving device in the first period, and a is the acceleration of the ultrasonic receiving device in the first period.

In an exemplary implementation, the operation of determining the ultrasonic measurement distance between the ultrasonic transmitting device and the ultrasonic receiving device in the second period may include:

determining the ultrasonic measurement distance between the ultrasonic transmitting device and the ultrasonic receiving device in the second period based on data of time when the ultrasonic signal is received by the ultrasonic receiving device in the second period and a propagation speed of the ultrasonic signal.

In a second aspect, an embodiment of the present application provides a control device for an ultrasonic receiving device. The ultrasonic receiving device includes at least two ultrasonic receivers. The control device includes a target receiver determination module and a control module.

The target receiver determination module is configured to determine a target receiver of the ultrasonic receiving device, where the target receiver is one of the at least two ultrasonic receivers on the ultrasonic receiving device that is the nearest to an ultrasonic transmitting device.

The control module is configured to control a state of each of the at least two ultrasonic receivers on the ultrasonic receiving device based on the determined target receiver.

In an exemplary implementation, the control module may be configured to control the state of each of the at least two ultrasonic receivers on the ultrasonic receiving device based on the determined target receiver in the following manner:

controlling the target receiver and an ultrasonic receiver meeting a set condition with the target receiver to be in an activated state, and controlling an ultrasonic receiver that does not meet the set condition with the target receiver to be in a closed state.

In an exemplary implementation, the target receiver determination module may be further configured to adjust the target receiver based on data of time when an ultrasonic signal is received by an activated ultrasonic receiver on the ultrasonic receiving device in a current signal cycle.

The control module may be further configured to adjust the state of each of the at least two ultrasonic receivers on the ultrasonic receiving device in a next signal cycle based on the adjusted target receiver.

In a third aspect, an embodiment of the present application provides an ultrasonic receiving device, including at least two ultrasonic receivers, a memory and a processor, where the memory is configured to store a control program for the ultrasonic receiving device, where the control program, when executed by the processor, causes the processor to perform operations of the control method provided in the first aspect.

In an exemplary implementation, the ultrasonic receiving device may further include an acceleration sensor, which is configured to detect a moving speed and an acceleration of the ultrasonic receiving device.

In a fourth aspect, an embodiment of the present application further provides an ultrasonic distance measurement system, including an ultrasonic transmitting device and an ultrasonic receiving device. The ultrasonic transmitting device is configured to control a signal strength of a transmitted ultrasonic signal according to a target measurement range. The ultrasonic receiving device is configured to determine a strength threshold of a received ultrasonic signal, and filter out a received ultrasonic signal with a signal strength less than the strength threshold.

In an exemplary implementation, the ultrasonic receiving device may include a control module and at least two ultrasonic receivers. The control module is configured to: determine a target receiver of the ultrasonic receiving device, where the target receiver is one of the at least two ultrasonic receivers on the ultrasonic receiving device that is the nearest to the ultrasonic transmitting device; and control a state of each of the at least two ultrasonic receivers on the ultrasonic receiving device based on the determined target receiver.

In an exemplary implementation, the ultrasonic receiving device may further include a ranging correction module and an acceleration sensor. The acceleration sensor is configured to detect a moving speed and an acceleration of the ultrasonic receiving device. The ranging correction module is configured to: determine a positioning distance of the ultrasonic receiving device in a second period based on a moving speed, acceleration and ultrasonic measurement distance between the ultrasonic transmitting device and the ultrasonic receiving device in a first period; determine an ultrasonic measurement distance between the ultrasonic transmitting device and the ultrasonic receiving device in the second period; and correct the ultrasonic measurement distance between the ultrasonic transmitting device and the ultrasonic receiving device in the second period according to a result of comparison between the ultrasonic measurement distance and the positioning distance of the ultrasonic receiving device in the second period; where the second period is a next signal cycle of the first period.

In addition, an embodiment of the present application provides a computer-readable medium, storing a control program for an ultrasonic receiving device, where the control program, when executed by a processor, implements operations of the control method provided in the first aspect.

In the embodiments of the present application, for an ultrasonic receiving device including at least two ultrasonic receivers, a target receiver of the ultrasonic receiving device is determined, where the target receiver is one of the at least two ultrasonic receivers on the ultrasonic receiving device that is the nearest to the ultrasonic transmitting device; and a state of each of the at least two ultrasonic receivers on the ultrasonic receiving device is controlled based on the determined target receiver. Thus, it is ensured that the ultrasonic receiving device receives only an effective ultrasonic signal transmitted by the ultrasonic transmitting device, thereby reducing the ultrasonic ranging error and improving the accuracy of measurement.

Other aspects will become apparent after reading and understanding the drawings and the following detailed description.

BRIEF DESCRIPTION OF DRAWINGS

FIG. 1 is a schematic diagram illustrating an example in which a device to be positioned has an ultrasonic ranging error.

FIG. 2 is a flowchart illustrating a control method for an ultrasonic receiving device according to an embodiment of the present application.

DETAILED DESCRIPTION

Hereinafter embodiments of the present application will be described in detail in connection with the accompanying drawings. It should be understood that the embodiments set forth below are intended for mere purposes of describing and illustrating the present application rather than limiting the present application.

It is to be noted that where no contradiction is preset, embodiments of the present application and features recited therein may be combined with each other and all such combinations shall fall in the scope of protection of the present application. In addition, although the flowcharts are used to illustrate logical sequences, in some circumstances the illustrated or described operations may be executed in sequences different than those described herein.

An ultrasonic ranging method may be used for tracking a position of an object. For example, an ultrasonic transmitter is at a fixed position, a position of an apparatus that is to be positioned and equipped with an ultrasonic receiver is constantly changing, and positions of the device to be positioned at different time may be obtained according to different differences of time when an ultrasonic signal is received by the ultrasonic receiver. Due to directivity of ultrasonic propagation, the ultrasonic receiver can receive the ultrasonic signal transmitted by the ultrasonic transmitter only when it directly faces or slightly deviates from the ultrasonic transmitter, and cannot receive the ultrasonic signal if it deviates from the above constraint position. To solve this problem, the device to be positioned may be equipped with multiple ultrasonic receivers, for example, around a circumferential direction, so that no matter how the device to be positioned moves, the ultrasonic signal can be received.

However, since ultrasonic waves may be reflected, the reflected ultrasonic signal may be received by part or all of the ultrasonic receivers on the device to be positioned, thereby affecting ultrasonic ranging accuracy. For example, as illustrated in FIG. 1, in a small space, since the ultrasonic waves can be reflected, when it encounters an obstacle such as a wall or an object, the ultrasonic signal may be reflected and received by multiple ultrasonic receivers on the device to be positioned, so that the device to be positioned has an error in ultrasonic ranging, thereby affecting distance measuring accuracy.

Figure 3:
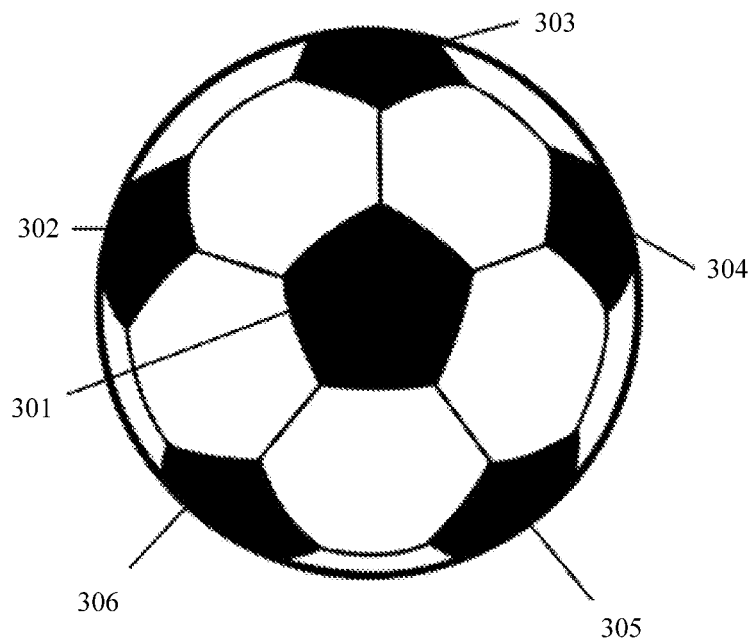
FIG. 3 is a schematic diagram illustrating the arrangement of ultrasonic receivers on an ultrasonic receiving device according to an embodiment of the present application.

FIG. 2 is a flowchart illustrating a control method for an ultrasonic receiving device according to an embodiment of the present application. In this embodiment, the ultrasonic receiving device includes at least two ultrasonic receivers. Exemplarily, as illustrated in FIG. 3, the ultrasonic receiving device is a sphere, and 12 ultrasonic receivers are arranged in order on a surface of the sphere, for example, six ultrasonic receivers 301 to 306 are shown in FIG. 3, and six ultrasonic receivers on the back of the sphere are not shown in FIG. 3. However, a shape of the ultrasonic receiving device and an arrangement manner of ultrasonic receivers are not limited in the present application.

As illustrated in FIG. 2, the control method provided by this embodiment includes operations described below.

In S201, a target receiver of the ultrasonic receiving device is determined, where the target receiver is one of the at least two ultrasonic receivers on the ultrasonic receiving device that is the nearest to an ultrasonic transmitting device. The target receiver is generally an ultrasonic receiver directly facing the ultrasonic transmitting device.

In S202, a state of each of the at least two ultrasonic receivers on the ultrasonic receiving device is controlled based on the determined target receiver.

The control method provided by this embodiment may be performed by the ultrasonic receiving device or a control apparatus connected to the ultrasonic receiving device. However, it is not limited in the present application.

In an exemplary implementation, S202 may include: controlling the target receiver and an ultrasonic receiver that meets a set condition with the target receiver to be in an activated state, and controlling an ultrasonic receiver that does not meet the set condition with the target receiver to be in a closed state.

Exemplarily, the ultrasonic receiver that meets the set condition with the target receiver may include an ultrasonic receiver with a distance from the target receiver meeting a first threshold on the ultrasonic receiving device, or an ultrasonic receiver within a range with the target receiver as a center and a second threshold as a radius on the ultrasonic receiving device.

The first threshold and the second threshold may be set depending on practical application scenarios. However, it is not limited in the present application.

In this example, an ultrasonic receiver directly facing or slightly deviating from the ultrasonic transmitting device on the ultrasonic receiving device is activated, and an ultrasonic receiver deviating from the above constraint position is closed, thereby determining that the ultrasonic receiving device receives only an effective ultrasonic signal transmitted by the ultrasonic transmitting device.

Exemplarily, S201 may include: determining the target receiver based on data of time when an ultrasonic signal is received by each of the at least two ultrasonic receivers on the ultrasonic receiving device in multiple signal cycles. However, it is not limited in the present application. In other implementations, when the target receiver is determined for a first time, the target receiver may also be determined in a specified manner.

Exemplarily, after S202, the control method in this embodiment may further include operations described below.

The target receiver is adjusted based on data of time when an ultrasonic signal is received by an activated ultrasonic receiver on the ultrasonic receiving device in a current signal cycle.

The state of each of the at least two ultrasonic receivers on the ultrasonic receiving device in a next signal cycle is adjusted based on the adjusted target receiver.

Exemplarily, the operation in which the state of each of the at least two ultrasonic receivers on the ultrasonic receiving device in the next signal cycle is adjusted based on the adjusted target receiver may include the operation described below.

The adjusted target receiver and an ultrasonic receiver that meets the set condition with the adjusted target receiver are controlled to be in an activated state, and an ultrasonic receiver that does not meet the set condition with the adjusted target receiver is controlled to be in a closed state.

The set condition is described as above, and thus is not repeated herein.

Exemplarily, the operation in which the target receiver is adjusted based on the data of time when the ultrasonic signal is received by the activated ultrasonic receiver on the ultrasonic receiving device in the current signal cycle may include operations as described below:

From the data of time when the ultrasonic signal is received in the current signal cycle, data of time whose difference with reference data of time has an absolute value less than or equal to a third threshold is selected, and an ultrasonic receiver corresponding to the selected data of time is adjusted to be the target receiver, where the reference data of time is data of time when the ultrasonic signal is received by a target receiver in a previous signal cycle.

The third threshold may be set according to practical application scenarios. However, it is not limited in the present application.

In this example, the target receiver may be dynamically adjusted to ensure that the activated ultrasonic receiver on the ultrasonic receiving device may directly face or slightly deviate from the ultrasonic transmitting device, so as to improve ranging accuracy during the movement of the ultrasonic receiving device.

In this embodiment, part of the ultrasonic receivers on the ultrasonic receiving device is closed, so as to shield an ultrasonic signal reflected by an obstacle. For example, in FIG. 1, a device to be positioned (i.e., the ultrasonic receiving device in this embodiment) has five ultrasonic receivers (indicated by circles in the device to be positioned in FIG. 1) that are respectively installed at upper left, lower left, upper right, lower right and middle positions of the device to be positioned; in a scenario shown in FIG. 1, if ultrasonic receivers at the upper right and lower right positions are closed, the device to be positioned will not receive the ultrasonic signal reflected by the obstacle and only receive an ultrasonic signal directly transmitted by the ultrasonic transmitting device, thereby reducing a positioning error and improving ultrasonic ranging accuracy.

The present application will be described below using the ultrasonic receiving device shown in FIG. 3 as an example.

In this example, as illustrated in FIG. 3, each ultrasonic receiver on the ultrasonic receiving device can receive the ultrasonic signal transmitted by the ultrasonic transmitting device or an ultrasonic signal transmitted from the space. After the ultrasonic signal is received for a period of time, time when each ultrasonic receiver receives the ultrasonic signal in multiple signal transmission intervals may be obtained. Since a movement trajectory is continuous, the time when the ultrasonic signal is received should be a continuous and smooth data line (for example, moments when the ultrasonic signal is received increase continuously or decrease continuously); at a selected certain moment, if data of the continuous and smooth data line comes from an ultrasonic receiver 301, the ultrasonic receiver 301 is regarded as the target receiver.

Then, one or more ultrasonic receivers around the target receiver 301 are activated. For example, activated are one or more ultrasonic receivers, each of which has a spherical distance that is the first threshold from the target receiver 301, for example, ultrasonic receivers 302, 303, 304, 305 and 306; and other ultrasonic receivers (other ultrasonic receivers on the back of the sphere not shown in FIG. 3) are closed.

In this example, the target receiver may be dynamically adjusted. For example, in a signal cycle after the target receiver 301 is determined, data of time when the above 6 activated ultrasonic receivers receive the ultrasonic signal in the signal cycle may be obtained, from which data of time that is the nearest to data of time when the target receiver 301 receives the ultrasonic signal in the previous signal cycle is selected, and the ultrasonic receiver corresponding to the selected data of time is adjusted to be the target receiver. For example, the data of time when the target receiver 301 receives the ultrasonic signal in the previous signal cycle is 10.01 ms, and the data of time when the 6 ultrasonic receivers receive the ultrasonic signal in the current signal cycle are respectively 10.03 ms (ultrasonic receiver 301), 16.7 ms (ultrasonic receiver 302), 10.3 ms (ultrasonic receiver 303), 10.02 ms (ultrasonic receiver 304), 10.03 ms (ultrasonic receiver 305) and 18.1 ms (ultrasonic receiver 306); then data of time that is the nearest to 10.01 ms is the data of time when the ultrasonic receiver 304 receives the ultrasonic signal, 10.02 ms, and therefore, the ultrasonic receiver 304 may be updated as the target receiver. In this example, after the ultrasonic receiver 304 is determined to be the target receiver, several ultrasonic receivers around the target receiver 304 may be activated, for example, the ultrasonic receivers 301, 303, 304 and 305 and another two ultrasonic receivers with a minimum distance from the target receiver 304 on the back of the sphere are activated, and the other ultrasonic receivers, for example, the ultrasonic receivers 302 and 306 and another four ultrasonic receivers on the back of the sphere (not shown) are closed.

It is to be noted that in this example, the target receiver may be dynamically adjusted according to the signal cycle, so that one or more ultrasonic receivers directly facing or slightly deviating from the ultrasonic transmitting device are activated according to a real-time position of the ultrasonic receiving device, and other ultrasonic receivers are closed, so as to reduce the positioning error of ultrasonic ranging and improve the ultrasonic ranging accuracy.

In this example, the ultrasonic receiving device may fuse data of time when activated multiple ultrasonic receivers receive the ultrasonic signal to obtain fused data of time when the ultrasonic signal is received by the ultrasonic receiving device, and then calculate a distance according to the fused data of time. A fusion manner may include, but is not limited to, a nearest neighbor method, a generalized correlation method, a Gaussian sum method, an optimal Bayesian method, a probabilistic data association method, symmetric measurement equation filtering, a weighted mean, a geometric mean, an arithmetic mean, a quadratic mean and a harmonic mean. However, it is not limited in the present application.

In an exemplary implementation, when the distance is calculated according to the fused data of time, an ultrasonic measurement distance in the current signal cycle may be calculated using the fused data of time, and the ultrasonic measurement distance measured in the current period may be corrected according to a result of comparing a positioning distance predicted based on a moving speed and an acceleration in the previous signal cycle with the ultrasonic measurement distance measured in the current period.

In another exemplary implementation, when the distance is calculated based on data of time of a single ultrasonic receiver (for example, the target receiver), the ultrasonic measurement distance in the current signal cycle may be calculated using the data of time of the target receiver, and the ultrasonic measurement distance measured in the current period may be corrected according to the result of comparing the positioning distance predicted based on the moving speed and the acceleration in the previous signal cycle with the ultrasonic measurement distance measured in the current period.

In this way, the moving speed and the acceleration of the ultrasonic receiving device are introduced to predict the positioning distance, and then the ultrasonic measurement distance is corrected through the positioning distance, thereby reducing the ultrasonic ranging error and improving the accuracy of distance measurement.

The ultrasonic receiving device may include an acceleration sensor, which is configured to detect the moving speed and the acceleration of the ultrasonic receiving device. The acceleration sensor (i.e., an accelerometer) is one of basic measurement elements of inertial navigation and guidance systems. The accelerometer is essentially an oscillation system installed inside a motion carrier (the ultrasonic receiving device in this embodiment) and may be used for measuring an acceleration of the carrier. For example, a working principle of a Micro-electro Mechanical Systems (MEMS) accelerometer is that when the accelerometer and an external object (an acceleration of the object is an acceleration to be measured) are accelerated together, a mass will move in a reverse direction under the action of an inertial force, a displacement of the mass is limited by a spring and a damper, and a size of the acceleration of the external object may be measured through an output voltage. However, a type of the acceleration sensor used is not limited in the present application.

In this example, a positioning distance of the ultrasonic receiving device in a second period may be determined based on a moving speed, acceleration and ultrasonic measurement distance between the ultrasonic transmitting device and the ultrasonic receiving device in a first period; an ultrasonic measurement distance between the ultrasonic transmitting device and the ultrasonic receiving device in the second period is determined; and the ultrasonic measurement distance between the ultrasonic transmitting device and the ultrasonic receiving device in the second period is corrected according to a result of comparison between the ultrasonic measurement distance and the positioning distance of the ultrasonic receiving device in the second period; where the second period is a next signal cycle of the first period.

In this example, in response to an absolute value of a difference between the ultrasonic measurement distance and the positioning distance in the second period being less than or equal to a fourth threshold, it is determined that the ultrasonic measurement distance between the ultrasonic transmitting device and the ultrasonic receiving device in the second period remains unchanged. In other words, the ultrasonic measurement distance in the second period is credible.

In response to the absolute value of the difference between the ultrasonic measurement distance and the positioning distance in the second period being greater than the fourth threshold, the ultrasonic measurement distance between the ultrasonic transmitting device and the ultrasonic receiving device in the second period is corrected to be the positioning distance in the second period. In other words, the ultrasonic measurement distance in the second period is incredible, and the predicted positioning distance in the second period is used as the ultrasonic measurement distance.

The fourth threshold may be set according to practical application scenarios. However, it is not limited in the present application.

In this example, the positioning distance of the ultrasonic receiving device in the second period may be calculated according to the following formula one:

$$S = S_0 + V_0 t + \tfrac{1}{2} a t^2$$

where $S$ is the positioning distance in the second period, $S_0$ is the ultrasonic measurement distance between the ultrasonic transmitting device and the ultrasonic receiving device in the first period, $t$ is a signal cycle, and $V_0$ is the moving speed of the ultrasonic receiving device in the first period, and $a$ is the acceleration of the ultrasonic receiving device in the first period.

Exemplarily, the operation in which the ultrasonic measurement distance between the ultrasonic transmitting device and the ultrasonic receiving device in the second period is determined may include an operation described below.

The ultrasonic measurement distance between the ultrasonic transmitting device and the ultrasonic receiving device in the second period is determined based on data of time when the ultrasonic signal is received by the ultrasonic receiving device in the second period and a propagation speed of the ultrasonic signal.

In this example, the ultrasonic measurement distance in the second period may be calculated according to the following formula two:

$$S'=V \times t';$$

where S' is the ultrasonic measurement distance in the second period, V is the propagation speed of the ultrasonic signal, and t' is the data of time when the ultrasonic signal is received by the ultrasonic receiving device in the second period. t' may be fused data of time when multiple ultrasonic receivers on the ultrasonic receiving device receive the ultrasonic signal in the second period or data of time when a single ultrasonic receiver on the ultrasonic receiving device receives the ultrasonic signal in the second period. Exemplarily, based on the scenario shown in FIG. 1, taking a signal cycle of 15 milliseconds (ms) as an example, the device to be positioned (i.e., the ultrasonic receiving device in this embodiment) receives the ultrasonic signal at 10 ms in a first signal cycle, it may be determined that a distance between the device to be positioned and an ultrasonic transmitter (i.e., the ultrasonic transmitting device in this embodiment) is 10 ms×340 m/s=3.4 m. In FIG. 1, 5 ultrasonic receivers are installed on the device to be positioned, and then the data, 10 ms, for the device to be positioned receiving the ultrasonic signal may be obtained by fusing data of time when the 5 ultrasonic receivers receive the ultrasonic signal. For example, the fusion manner may include, but is not limited to, one of the nearest neighbor method, the generalized correlation method, the Gaussian sum method, the optimal Bayesian method, the probabilistic data association method, the symmetric measurement equation filtering, the weighted mean, the geometric mean, the arithmetic mean, the quadratic mean or the harmonic mean. However, it is not limited in the present application. Alternatively, the data, 10 ms, for the device to be positioned receiving the ultrasonic signal may be data of time when a single ultrasonic receiver (for example, the target receiver) on the device to be positioned receives the ultrasonic signal.

As illustrated in FIG. 1, an obstacle exists behind or to the side of the device to be positioned, and data of time when the device to be positioned receives the ultrasonic signal reflected by the obstacle in the first signal cycle may be 23 ms, which is beyond the first signal cycle and in a second signal cycle, embodied as receiving the ultrasonic signal at 8 ms in the second signal 20 cycle. If the device to be positioned is moving away from the ultrasonic transmitter, data of time when the ultrasonic signal transmitted in the second signal cycle is practically received by the device to be positioned may be 11 ms. To filter out the reflected ultrasonic signal, generally data of time when the ultrasonic signal is received first in each signal cycle is selected as a basis for a distance calculation, so the practical data 11 ms is filtered out and the error data 8 ms is reserved. The distance is calculated according to the error data, embodied as the device to be positioned moving towards the ultrasonic transmitter, resulting in the positioning error. If the device to be positioned is moving towards the ultrasonic transmitter, data of time when the ultrasonic signal transmitted in the second signal cycle is practically received may be 9 ms. To filter out the reflected ultrasonic signal, generally the data of time when the ultrasonic signal is 30 received first in each signal cycle is selected as the basis for the distance calculation, so the practical data 9 ms is filtered out and the error data 8 ms is reserved, which may result in the positioning error. In this example, a value of S' may be calculated according to the determined data of time (for example, 8 ms) through the formula one. If S' is within a range of S± the fourth threshold (S is calculated through the formula two), S' is considered credible, or otherwise, S' is considered incredible, thereby reducing the positioning error and improving the accuracy of distance measurement.

In an exemplary implementation, the ultrasonic receiving device cooperates with the ultrasonic transmitting device to achieve the ultrasonic ranging. Interference of the reflected ultrasonic signal can also be eliminated by controlling at least one of a strength of a signal transmitted by the ultrasonic transmitting device or a strength threshold of each ultrasonic receiver.

In this example, during the practical propagation of ultrasonic waves, the ultrasonic waves may attenuate to different degrees when affected by many factors. There are three main types of attenuation of the ultrasonic waves: scattering, diffusion and absorption. A signal strength of an ultrasonic signal transmitted by the ultrasonic transmitting device needs to be controlled according to a target measurement range. For example, if the target measurement range is less than or equal to 5 m, and the signal strength of the ultrasonic signal transmitted by the ultrasonic transmitting device attenuates from 80 to 0 at a distance of 5 m, the signal strength of the ultrasonic signal transmitted by the ultrasonic transmitting device needs to be controlled to be greater than 80 since the ultrasonic receiver can recognize an ultrasonic signal with a certain strength when it is received. Since the ultrasonic waves may be reflected, the reflected ultrasonic signals may be received by the ultrasonic receiving device, thereby affecting the ultrasonic ranging accuracy. Therefore, these reflected ultrasonic signals need to be filtered out. Due to the attenuation of ultrasonic waves, a signal strength of the reflected wave decreases. Therefore, the reflected wave may be filtered out by determining a strength threshold of the ultrasonic signal received by the ultrasonic receiver and controlling the ultrasonic receiver to filter out a received ultrasonic signal whose signal strength is less than the strength threshold. Exemplarily, a strength value of the ultrasonic signal when a distance from the ultrasonic receiver to the ultrasonic transmitting device at a current angle is a set value (for example, 5 m) may be used as the strength threshold for the ultrasonic receiver to filter out the ultrasonic signal with a signal strength less than the strength threshold in the next signal cycle, that is, filter out the ultrasonic signal reflected by the obstacle such as a wall. The strength value of the ultrasonic signal when the distance from the ultrasonic receiver to the ultrasonic transmitting device at the current angle is the set value may be determined in a pre-detection manner. For example, if a transmission strength of the ultrasonic transmitting device is 100, and a strength received by the ultrasonic receiver 5 m away from the ultrasonic transmitting device is 30, 30 is used as the strength threshold for the ultrasonic receiver to filter out an ultrasonic signal less than 30 in the next signal cycle.

In addition, for a moving ultrasonic receiving device, it is convenient to track its movement trajectory by obtaining one distance value in a short signal cycle. In this example, the signal cycle of the ultrasonic signal transmitted by the ultrasonic transmitting device may be controlled according to the target measurement range and an ultrasonic propagation speed. Taking a target measurement range of 5 meters (m) as an example, data of time for the ultrasonic signal transmitted by the ultrasonic transmitting device to propagate 5 m is about 15 ms, where the ultrasonic propagation speed is about 340 m/s (the propagation speed of the ultrasonic waves changes up and down at 340 m/s in response to effects of environmental factors such as temperature and humidity). Therefore, a transmission interval between two ultrasonic signals (that is, the signal cycle) may be set to be slightly greater than 15 ms, such as 18 ms. However, it is not limited in the present application. In theory, the signal cycle should be greater than 15 ms.

In an example, in a signal cycle when an ultrasonic distance measurement system (including the ultrasonic receiving device and the ultrasonic transmitting device) initiates an anti-interference mode, the strength of the signal transmitted by the ultrasonic transmitting device is determined according to the target measurement range, and the ultrasonic transmitting device transmits the ultrasonic signal according to the determined signal cycle and the strength of the transmitted signal. The ultrasonic receiving device includes at least two ultrasonic receivers, each ultrasonic receiver detects the received ultrasonic signal according to the determined strength threshold and filters out the ultrasonic signal whose signal strength is less than the strength threshold, and the ultrasonic receiving device closes unnecessary ultrasonic receivers based on the determined target receiver. In addition, the ultrasonic receiving device fuses the data of time when the ultrasonic signal is received by the activated ultrasonic receivers to obtain the fused data of time, and calculates the ultrasonic measurement distance in the current signal cycle using the fused data of time, or the ultrasonic receiving device calculates the ultrasonic measurement distance in the current signal cycle using the data of time when the ultrasonic signal is received by the single ultrasonic receiver (for example, the target receiver); and the ultrasonic measurement distance measured in the current period is corrected according to the result of comparing the positioning distance predicted based on the moving speed and the acceleration in the previous signal cycle with the ultrasonic measurement distance measured in the current period. The fusion manner of data of time is described as above, and thus is not repeated herein. In this example, a variety of ultrasonic anti-interference manners are combined to effectively eliminate the interference of the reflected ultrasonic signal.

In another example, each ultrasonic receiver on the ultrasonic receiving device may filter out the received ultrasonic signal whose signal strength is less than the strength threshold according to the determined strength threshold of the received ultrasonic signal. Moreover, the ultrasonic receiving device closes the unnecessary ultrasonic receivers based on the determined target receiver. In addition, the ultrasonic receiving device fuses the data of time when the ultrasonic signal is received by the activated ultrasonic receivers to obtain the fused data of time, and calculates the ultrasonic measurement distance in the current signal cycle using the fused data of time, or the ultrasonic receiving device calculates the ultrasonic measurement distance in the current signal cycle using the data of time when the ultrasonic signal is received by the single ultrasonic receiver (for example, the target receiver); and the ultrasonic measurement distance measured in the current period is corrected according to the result of comparing the positioning distance predicted based on the moving speed and the acceleration in the previous signal cycle with the ultrasonic measurement distance measured in the current period.

In another example, the ultrasonic receiving device may fuse the data of time when the ultrasonic signal is received by the activated ultrasonic receivers to obtain the fused data of time, calculate the ultrasonic measurement distance in the current signal cycle using the fused data of time, and correct the ultrasonic measurement distance measured in the current period according to the result of comparing the positioning distance predicted based on the moving speed and the acceleration in the previous signal cycle with the ultrasonic measurement distance measured in the current period.

In other words, in practical applications, one or more of a signal strength control scheme of the ultrasonic transmitting device, a signal filtering scheme of the ultrasonic receiving device, a target receiver adjustment scheme of the ultrasonic receiving device or a scheme of correcting the ultrasonic measurement distance using the acceleration are combined to improve the ultrasonic ranging accuracy.

Figure 4:
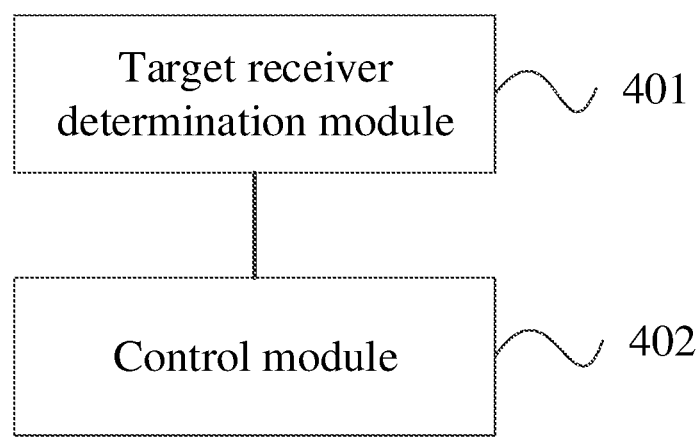
FIG. 4 is a block diagram illustrating a control device for an ultrasonic receiving device according to an embodiment of the present application.

FIG. 4 is a schematic diagram of a control device for an ultrasonic receiving device according to an embodiment of the present application. In this embodiment, the ultrasonic receiving device may include at least two ultrasonic receivers. As illustrated in FIG. 4, the control device provided by this embodiment includes a target receiver determination module 401 and a control module 402.

The target receiver determination module 401 is configured to determine a target receiver of the ultrasonic receiving device, where the target receiver is one of the at least two ultrasonic receivers on the ultrasonic receiving device that is the nearest to an ultrasonic transmitting device. The target receiver is generally an ultrasonic receiver directly facing the ultrasonic transmitting device.

The control module 402 is configured to control a state of each of the at least two ultrasonic receivers on the ultrasonic receiving device based on the determined target receiver.

Exemplarily, the control module 402 may be configured to control the state of each of the at least two ultrasonic receivers on the ultrasonic receiving device based on the determined target receiver in the following manner.

The target receiver and an ultrasonic receiver that meets a set condition with the target receiver are controlled to be in an activated state, and an ultrasonic receiver that does not meet the set condition with the target receiver is controlled to be in a closed state.

Exemplarily, the target receiver determination module 401 may be further configured to adjust the target receiver based on data of time when an ultrasonic signal is received by an activated ultrasonic receiver on the ultrasonic receiving device in a current signal cycle.

The control module 402 may be further configured to adjust the state of each of the at least two ultrasonic receivers on the ultrasonic receiving device in a next signal cycle based on the adjusted target receiver.

For the related description of the control device provided by this embodiment, reference may be made to the description of the above-mentioned method embodiment, and thus no further details are provided herein.

Figure 5:
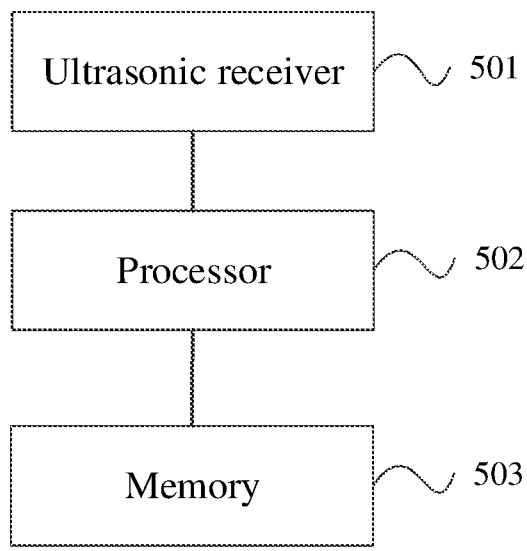
FIG. 5 is a block diagram illustrating an ultrasonic receiving device according to an embodiment of the present application.

FIG. 5 is a schematic diagram of an ultrasonic receiving device according to an embodiment of the present application. As illustrated in FIG. 5, the ultrasonic receiving device according to the embodiment of the present application includes at least two ultrasonic receivers 501, a memory 503 and a processor 502, where the memory 503 is configured to store a control program for the ultrasonic receiving device, where the control program, when executed by the processor 502, implements operations of the control method provided by the above-mentioned embodiments.

The processor 502 may include, but is not limited to, a microcontroller unit (MCU), a field programmable gate array (FPGA) or another processing device. The memory 503 may be configured to store software programs and modules of application software, such as program instructions or modules corresponding to the control method in the embodiment. The processor 502 executes the software programs and modules stored in the memory 503, so as to perform various function applications and data processing, that is, to perform the control method described above. The memory 503 may include a high-speed random access memory, and may further include a nonvolatile memory, such as one or more magnetic storage devices, flash memories or other nonvolatile solid-state memories. In some examples, the memory 503 may include memories that are remotely disposed with respect to the processor 502, and these remote memories may be connected to the ultrasonic receiving device via a network. Examples of the above network include, but are not limited to, the Internet, an intranet, a local area network, a mobile communication network and a combination thereof.

Figure 6:
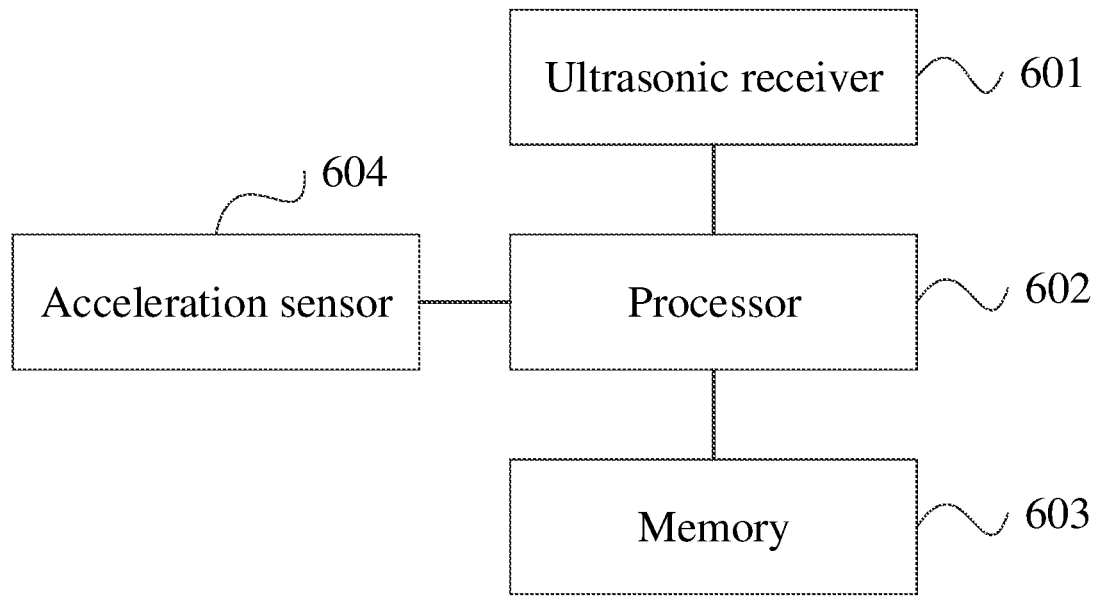
FIG. 6 is another block diagram illustrating an ultrasonic receiving device according to an embodiment of the present application.

FIG. 6 is another schematic diagram of an ultrasonic receiving device according to an embodiment of the present application. As illustrated in FIG. 6, the embodiments of the present application further provide an ultrasonic receiving device including an ultrasonic receiver 601, an acceleration sensor 604, a memory 603 and a processor 602. The ultrasonic receiver 601 is configured to detect an ultrasonic signal. The acceleration sensor 604 is configured to detect a moving speed and an acceleration of the ultrasonic receiving device. The memory 603 is configured to store a control program which, when executed by the processor 602, implements operations of the control method provided by the above-mentioned embodiments.

For the related description of the ultrasonic receiver 601, the memory 603 and the processor 602, reference may be made to the description of the ultrasonic receiver 501, the memory 503 and the processor 502, and thus no further details are provided herein. For the related description of the acceleration sensor 604, reference may be made to the related description of the above-mentioned method embodiment, and thus no further details are provided herein.

Figure 7:
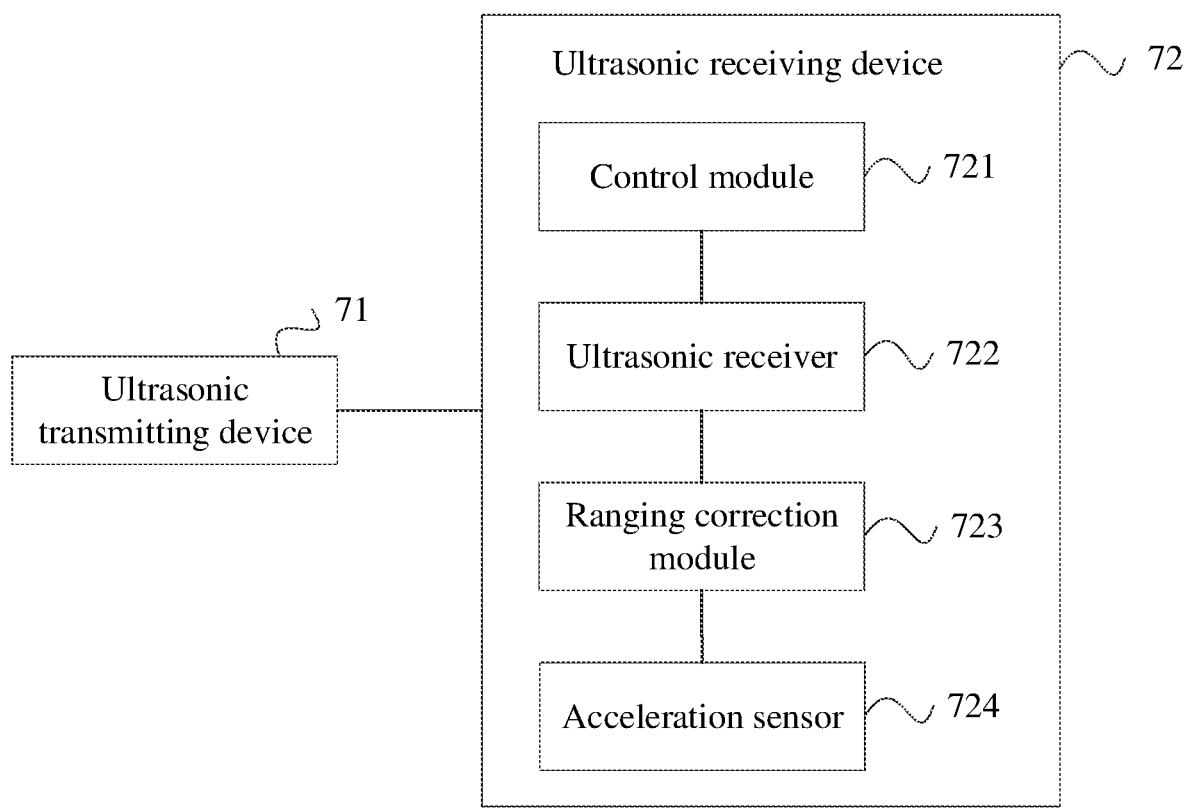
FIG. 7 is a schematic diagram illustrating an ultrasonic distance measurement system according to an embodiment of the present application.

FIG. 7 is a schematic diagram of an ultrasonic distance measurement system according to an embodiment of the present application. As illustrated in FIG. 7, the ultrasonic distance measurement system in this embodiment includes an ultrasonic transmitting device 71 and an ultrasonic receiving device 72. The ultrasonic transmitting device 71 is configured to control a signal strength of a transmitted ultrasonic signal according to a target measurement range. The ultrasonic receiving device 72 is configured to determine a strength threshold of a received ultrasonic signal, and filter out a received ultrasonic signal with a signal strength less than the strength threshold.

Exemplarily, the ultrasonic receiving device 72 may include a control module 721 and at least two ultrasonic receivers 722. The control module 721 may be configured to: determine a target receiver of the ultrasonic receiving device 72, where the target receiver is one of the at least two ultrasonic receivers on the ultrasonic receiving device 72 that is the nearest to the ultrasonic transmitting device 71 and generally an ultrasonic receiver directly facing the ultrasonic transmitting device 71; and control a state of each of the at least two ultrasonic receivers on the ultrasonic receiving device 72 based on the determined target receiver.

Exemplarily, the ultrasonic receiving device 72 may further include a ranging correction module 723 and an acceleration sensor 724. The acceleration sensor 724 may be configured to detect a moving speed and an acceleration of the ultrasonic receiving device 72. The ranging correction module 723 may be configured to: determine a positioning distance of the ultrasonic receiving device 72 in a second period based on a moving speed, acceleration and ultrasonic measurement distance from the ultrasonic transmitting device 71 of the ultrasonic receiving device 72 in a first period; determine an ultrasonic measurement distance from the ultrasonic transmitting device 71 of the ultrasonic receiving device 72 in the second period; and correct the ultrasonic measurement distance from the ultrasonic transmitting device 71 of the ultrasonic receiving device 72 in the second period according to a result of comparison between the ultrasonic measurement distance and the positioning distance of the ultrasonic receiving device 72 in the second period; where the second period is a next signal cycle of the first period.

For the related description of the ultrasonic distance measurement system provided by this embodiment, reference may be made to the description of the above-mentioned method embodiment, and thus no further details are provided herein.

In addition, the embodiments of the present application further provide a computer-readable medium, storing a control program for an ultrasonic receiving device, where the control program, when executed by a processor, causes the processor to perform operations of the control method provided by the above-mentioned embodiments.

It should be understood by those skilled in the art that functional modules or units in all or part of the operations of the method, the system and the device disclosed above may be implemented as software, firmware, hardware and appropriate combinations thereof. In the hardware implementation, the division of the functional modules or units mentioned in the above description may not correspond to the division of physical components. For example, one physical component may have multiple functions, or one function or operation may be executed jointly by several physical components. Some or all components may be implemented as software executed by processors such as digital signal processors or microcontrollers, hardware, or integrated circuits such as application-specific integrated circuits. Such software may be distributed on computer-readable media, which may include computer storage media (non-transitory media) and communication media (transitory media). As is known to those skilled in the art, the term, computer storage media, includes volatile and nonvolatile, removable and non-removable media implemented in any method or technology for storing information (such as computer-readable instructions, data structures, program modules or other data). The computer storage media include, but are not limited to, a random access memory (RAM), a read-only memory (ROM), an electrically erasable programmable read-only memory (EEPROM), a flash memory or other memory technologies, a compact disc read-only memory (CD-ROM), a digital versatile disc (DVD), or other optical disc storage, magnetic cassettes, magnetic tapes, magnetic disk storage or other magnetic storage devices, or any other media used for storing desired information and accessible by a computer. In addition, as is known to those skilled in the art, the communication media generally include computer-readable instructions, data structures, program modules or other data in modulated data signals such as carriers or other transmission mechanisms, and may include any information delivery media.

The above has described and illustrated the basic principles, main features and advantages of the present application. The present application however will not be limited to the above embodiments. The above embodiments and the specification merely describe the principles of the present application. Various modifications and improvements may be made based on the present application without departing from the spirit and scope of the present application, and all such modifications and improvements shall fall in the scope of the present application.

INDUSTRIAL APPLICABILITY

Embodiments of the present application provide a control method and a control device for an ultrasonic receiving device, which can reduce the ultrasonic ranging error and improve the accuracy of measurement.

What is claimed is:

1. A control method for an ultrasonic receiving device, the ultrasonic receiving device comprising at least two ultrasonic receivers, and the control method comprising:
   determining a target receiver of the ultrasonic receiving device, wherein the target receiver is one of the at least two ultrasonic receivers and directly faces an ultrasonic transmitting device;
   controlling a state of each of the at least two ultrasonic receivers in a current signal cycle;
   wherein,
      the controlling comprises: controlling the target receiver and an ultrasonic receiver in the ultrasonic receiving device, which has a preset distance to the target receiver, to be in an activated state, and controlling an ultrasonic receiver which does not have the preset distance to the target receiver to be in a closed state; or
      the controlling comprises: controlling the target receiver and an ultrasonic receiver in the ultrasonic receiving device, which is located within a range of a circle taking the target receiver as a center and a preset value as a radius, to be in an activated state, and controlling an ultrasonic receiver in the ultrasonic receiving device that is not located within the range of the circle to be in a closed state;
   selecting one time from a plurality of times when an ultrasonic signal is received by all ultrasonic receivers in the activated state in the current signal cycle, and determining one ultrasonic receiver, whose time for receiving the ultrasonic signal is the selected one time, to be an updated target receiver used for a next signal cycle after the current signal cycle, wherein each of all ultrasonic receivers in the activated state in the current signal cycle has one time when the ultrasonic signal is received by the ultrasonic receiver in the current signal cycle, the selected one time among the plurality of times has minimum absolute difference value with a reference time, and the reference time is a time when the ultrasonic signal is received by a previous target receiver used for a previous signal cycle before the current signal cycle; and
   controlling the state of each of the at least two ultrasonic receivers in the next signal cycle with the updated target receiver as the controlling in the current signal cycle.

2. The control method of claim 1, wherein determining the target receiver of the ultrasonic receiving device comprises:
   determining the target receiver based on a plurality of times when an ultrasonic signal is received by each of the at least two ultrasonic receivers in the ultrasonic receiving device within a plurality of signal cycles.

3. The control method of claim 1, further comprising at least one of:

controlling a signal strength of an ultrasonic signal transmitted by the ultrasonic transmitting device according to a target measurement range; or
determining a strength threshold of an ultrasonic signal received by the ultrasonic receiving device, and controlling the ultrasonic receiving device to filter out a received ultrasonic signal with signal strength less than the strength threshold.

4. The control method of claim 3, further comprising:
controlling a signal cycle of the ultrasonic signal transmitted by the ultrasonic transmitting device based on the target measurement range and an ultrasonic propagation speed.

5. The control method of claim 1, further comprising:
determining a positioning distance of the ultrasonic receiving device in a second period based on a moving speed, acceleration, and ultrasonic measurement distance between the ultrasonic transmitting device and the ultrasonic receiving device in a first period;
determining an ultrasonic measurement distance between the ultrasonic transmitting device and the ultrasonic receiving device in the second period; and
correcting the ultrasonic measurement distance between the ultrasonic transmitting device and the ultrasonic receiving device in the second period based on a result of comparison between the ultrasonic measurement distance against the positioning distance of the ultrasonic receiving device in the second period;
wherein the second period is a next signal cycle of the first period.

6. The control method of claim 5, wherein correcting the ultrasonic measurement distance between the ultrasonic transmitting device and the ultrasonic receiving device in the second period based on the result of comparison between the ultrasonic measurement distance against the positioning distance of the ultrasonic receiving device in the second period comprises:
   in response to an absolute value of a difference between the ultrasonic measurement distance and the positioning distance in the second period being less than or equal to a fourth threshold, determining that the ultrasonic measurement distance from the ultrasonic transmitting device to the ultrasonic receiving device in the second period remains unchanged; and
   in response to the absolute value of the difference between the ultrasonic measurement distance and the positioning distance in the second period being greater than the fourth threshold, correcting the ultrasonic measurement distance between the ultrasonic transmitting device and the ultrasonic receiving device in the second period to be the positioning distance in the second period.

7. The control method of claim 5, wherein determining the positioning distance of the ultrasonic receiving device in the second period based on the moving speed, acceleration, and ultrasonic measurement distance between the ultrasonic transmitting device and the ultrasonic receiving device in the first period comprises:
   calculating the positioning distance of the ultrasonic receiving device in the second period according to the following formula:

$$S = S_0 + V_0 t + \tfrac{1}{2} a t^2$$

where S is the positioning distance in the second period, $S_0$ is the ultrasonic measurement distance between the ultrasonic transmitting device and the ultrasonic receiving device in the first period, t is a signal cycle, and $V_0$ is the moving speed of the ultrasonic receiving device in the first period, and a is the acceleration of the ultrasonic receiving device in the first period.

8. The control method of claim 5, wherein determining the ultrasonic measurement distance between the ultrasonic transmitting device and the ultrasonic receiving device in the second period comprises:

determining the ultrasonic measurement distance between the ultrasonic transmitting device and the ultrasonic receiving device in the second period based on a time when the ultrasonic signal is received by the ultrasonic receiving device in the second period and a propagation speed of the ultrasonic signal.

9. A control device for an ultrasonic receiving device, the ultrasonic receiving device comprising at least two ultrasonic receivers, and the control device comprising:

a target receiver determination module, configured to determine a target receiver of the ultrasonic receiving device, wherein the target receiver is one of the at least two ultrasonic receivers and directly faces an ultrasonic transmitting device; and a control module, configured to control a state of each of the at least two ultrasonic receivers in a current signal cycle;

wherein, the controlling comprises: controlling the target receiver and an ultrasonic receiver in the ultrasonic receiving device, which has a preset distance to the target receiver, to be in an activated state, and controlling an ultrasonic receiver which does not have the preset distance to the target receiver to be in a closed state; or the controlling comprises: controlling the target receiver and an ultrasonic receiver in the ultrasonic receiving device, which is located within a range of a circle taking the target receiver as a center and a preset value as a radius, to be in an activated state, and controlling an ultrasonic receiver in the ultrasonic receiving device that is not located within the range of the circle to be in a closed state;

wherein the target receiver determination module is further configured to select one time from a plurality of times when an ultrasonic signal is received by all ultrasonic receivers in the activated state in the current signal cycle, and determine one ultrasonic receiver, whose time for receiving the ultrasonic signal is the selected one time, to be an updated target receiver used for a next signal cycle after the current signal cycle, wherein each of all ultrasonic receivers in the activated state in the current signal cycle has one time when the ultrasonic signal is received by the ultrasonic receiver in the current signal cycle, the selected one time among the plurality of times has minimum absolute difference value with a reference time, and the reference time is a time when the ultrasonic signal is received by a previous target receiver used for a previous signal cycle before the current signal cycle, and wherein the control module is further configured to control the state of each of the at least two ultrasonic receivers in the next signal cycle with the updated target receiver as the control in the current signal cycle.

10. An ultrasonic receiving device, comprising at least two ultrasonic receivers, a memory, and a processor, wherein the memory is configured to store a control program for the ultrasonic receiving device, wherein the control program when executed by the processor causes the processor to perform the control method as recited in claim 1.

11. The ultrasonic receiving device of claim 10, further comprising:

an acceleration sensor, configured to detect a moving speed and an acceleration of the ultrasonic receiving device.

12. A computer-readable medium, storing a control program for an ultrasonic receiving device, wherein the control program when executed by a processor causes the processor to perform the control method as recited in claim 1.

* * * * *